United States Patent Office 3,730,733
Patented May 1, 1973

3,730,733
ANTIDIABETIC COMPOSITION OF BEET ROOTS
AND HORSERADISH
Josef Vujcuf, 42 Schusselbergstrasse 8,
Munich, Germany
No Drawing. Filed Jan. 12, 1971, Ser. No. 105,943
Claims priority, application Germany, Dec. 24, 1970,
P 20 63 845.3
Int. Cl. A23l 1/00
U.S. Cl. 99—100                                    5 Claims

ABSTRACT OF THE DISCLOSURE

An antidiabetic vegetable composition which is composed of red beet-roots and, per 100 parts by weight thereof, of 10 to 25 parts by weight, preferably 12 to 20 parts by weight of horse-radish, about 3 to about 15 parts by weight of a vegetable oil; preferably of high unsaturation, and from about 3 to about 16 parts by weight of vinegar, preferably apple or pear vinegar of about 5% concentration, and up to 5% by weight, based on the composition, of other taste modifying agents and/or food preservatives, preferably 2 to 6 parts by weight of wine per 100 parts by weight of beet-roots, said composition having surprisingly antidiabetic and some diuretic effects but convenient taste, especially if made up like a salad. The composition is stable more than a year if pasteurized at 75 to 90° C. and sealed air-tight without any preservatives added.

BACKGROUND OF THE INVENTION

The invention relates to an antidiabetic vegetable composition, in particular in the form of a dietetic salad composed of red beet-roots (*Beta vulgaris* var.), horse-radish (*Cochlearia armoracia*), a vegetable oil, vinegar and optionally taste improving additives and/or preservatives.

Object of the invention is to treat and to assist treatment of diabetics in a way which eliminates or reduces the use of chemical drugs and/or hormone compositions. A further object of the invention is to provide a novel vegetable composition of acceptable taste preferably in the form of a salad primarily for treating or assisting treatment of human diabetics. A further object of the invention is to provide a vegetable composition having beneficial antidiabetic and further some diuretic and blood purifying effects. A further object of the invention is to provide a method of manufacturing a composition having said properties.

SUMMARY OF THE INVENTION

It has been found that a vegetable composition consisting essentially of red beet-roots and 10 to 25 parts by weight of horse-radish and further of about 8 to about 15 parts by weight of a vegetable oil and from about 8 to about 16 parts by weight of vinegar per 100 parts by weight of beet-roots and optionally up to about 5 percent by weight, based on the weight of the composition, of other taste modifying agents and/or food preservatives surprisingly has strong antidiabetic effects besides some diuretic effects which may enable a patient suffering from diabetes to partly or wholly substitute treatment by chemical antidiabetic drugs or hormone injections by a daily dose of the well-tasting composition, in particular in the form of a salad. The amounts stated herein refer to washed and peeled and, if desired, boiled red beet roots and to washed and trimmed raw horse radish.

As vinegar perferably fruit vinegar such as manufactured from apples or pears having a concentration of about 5 percent by weight is used. The preferred vegetable oils are oils having a high content of multiple unsaturated fatty acid compounds, in particular sun-flower oil, rape-oil and, most preferred, linseed-oil.

The preferred composition is a dietetic salad composed of horse-radish, red beet-roots, linseed-oil and fruit vinegar having a weight ratio of horse-radish to red beet-roots of about 12 to 20:100. Preferably the composition further contains wine, in particular a flavouring red wine in an amount of from 2 to 6 parts by weight per 100 parts by weight of red beet-roots.

DESCRIPTION OF THE INVENTION

It has been found that by eating the composition of the invention in daily doses of about 100 g. to 200 g. the blood sugar content of patients suffering from diabetes is drastically reduced within a short period of time. This is particularly surprising because especially vegetables of the plant family Chenopodiacea, in particular the different species of *Beta vulgaris* have a relatively high content of sucrose.

Although it has been known that for instance the taste of a salad of red beet-roots can be improved by the addition of small amounts of horse-radish the high amounts of the mustard oil glycoside containing cruciferous plant in the composition of the invention have been considered too high for providing a well-tasting composition or salad. Surprisingly a very well tasting and further a very useful salad particularly against diabetes can be manufactured according to the invention which shows besides of a marked antidiabetic effect unknown so far some diuretic and blood purifying effects.

It is preferred to use the vegetables contained in the antidiabetic composition of the invention not in a fresh state but rather after having them stored for some time, such as during winter, in a raw state. Thereby the water content of the beet-roots and the horse-radish is reduced and storage periods of the composition are prolonged thus enabling the manufacture of a salad free from additional food preservatives in a large industrial scale. The water content may also be lowered by other means, for instance by a vacuum treatment. Preferably no taste improving and/or preserving agents or only small amounts such as in the range of from about 1 to 5 percent by weight thereof are used.

The amount of oil added is generally from about 8 to about 15 parts by weight per 100 parts by weight of red beet-roots. The amount of vinegar is from about 8 to about 16 parts by weight on the same basis in the form of a commercial vinegar of a concentration of about 5 percent by weight. The addition of wine softens the taste of the salad.

For improving durability and storability of the composition of the invention the ingredients may be pasteurized before or, preferably, after filling the composition into containers, such as glasses, and sealed air-tight. Usually the temperature range used as pasteurizing the composition amounts from about 75° C. to about 90° C. The pasteurization period should not exceed one hour. A composition being pasteurized at 88° C. for about one hour can be stored for more than one year if filled into glass containers and sealed air-tight with vacuum covers without losing taste and effects. The vegetable ingredients are preferably reduced to small pieces of less than one inch in a known manner, such as by rasping, shaving or cutting in order to obtain a thorough blend of ingredients.

The invention is illustrated by the following example.

EXAMPLE

One hundred kilograms of red beet-roots (*Beta vulgaris* var. *Rapa cruenta*) which have been stored for some months, are washed, peeled and finely rasped. Further 14 kilograms of horse-radish roots which have also been stored for some months are washed, trimmed and rasped and blended with the beet-roots. To the mixture there are added 10 kilograms of linseed-oil and 12 kilograms of a 5% apple vinegar as well as 3 litres of red wine of Rumania. The mixture is blended thoroughly and filled into glass containers which are then pasteurized at 88° C. for one hour and immediately afterwards sealed air-tight by covers lined with plastics material.

A person suffering from diabetes and eating the above composition in daily doses of 100 g. for 14 days showed a decrease of the blood-sugar content of from 175 mg.-percent to 130 mg.-percent after this period. After eating of about 200 g. daily for 8 days the blood-sugar level was lowered from 240 mg.-percent to 145 mg.-percent.

I claim:
1. Antidiabetic, sugar-free vegetable composition consisting essentially of a mixture of 100 parts by weight of comminuted red beet roots and of about 10 parts to about 25 parts by weight of comminuted horse radish with about 8 parts to about 15 parts by weight of a vegetable oil and about 8 parts to about 15 parts by weight of vinegar.
2. Antidiabetic vegetable composition as claimed in claim 1 wherein the content of horse radish is 12 parts to 20 parts by weight per 100 parts by weight of red beet roots.
3. Antidiabetic vegetable composition as claimed in claim 1 additionally containing about 2 parts to about 6 parts by weight of wine per 100 parts by weight of red beet roots.
4. The composition of claim 1, having additionally admixed thereto a taste modifying agent in an amount not exceeding 5% by weight of the composition.
5. Antidiabetic vegetable composition consisting essentially of aetaoin
5. Antidiabetic vegetable composition consisting of a mixture of 100 parts by weight of comminuted red beet roots, 12 parts to 20 parts by weight of comminuted horse radish, 8 parts to 15 parts by weight of a vegetable oil selected from the group consisting of sunflower oil, rape seed oil, and linseed oil, 8 parts to 16 parts by weight of vinegar of about 5% concentration derived from a fruit selected from the group consisting of apples and pears, and 2 parts to 6 parts by weight of wine.

References Cited

UNITED STATES PATENTS

| | | | |
|---|---|---|---|
| 98,875 | 1/1870 | Mays | 424—195 |
| 120,802 | 11/1871 | Washburn | 424—195 |

OTHER REFERENCES

The Good Housekeeping Cookbook, S.B. March (ed). Rinehart & Co. Inc., N.Y. & Toronto, 1942, p. 504.

Ida Bailey Allen's Modern Cookbook, Garden City, Publishing Co. Inc., N.Y., 1924, p. 845.

The New Settlement Cookbook, 1954, Kandr, Simon & Schuster, N.Y., p. 592.

German Cookery, Schuler, Crown Publishers Inc., N.Y., 1955, P. 103.

NORMAN YUDKOFF, Primary Examiner

M. G. MULLEN, Assistant Examiner

U.S. Cl. X.R.

424—195